July 9, 1940.  C. J. McNAMARA  2,207,382

PRESSURE RELIEF VALVE

Filed Jan. 30, 1939

INVENTOR.
Charles J. McNamara
BY
Robbar Robb
ATTORNEYS

Patented July 9, 1940

2,207,382

UNITED STATES PATENT OFFICE 2,207,382

PRESSURE RELIEF VALVE

Charles J. McNamara, Pittsburgh, Pa., assignor, by mesne assignments, to Reconstruction Finance Corporation, Washington, D. C.

Application January 30, 1939, Serial No. 253,679

5 Claims. (Cl. 277—21)

The purpose of this invention has been to devise a novel and advantageous construction of back pressure relief valve for water heating and similar systems where such a valve is commonly employed or required today.

A special objective achieved in the designing of the valve construction hereinafter set forth has been to produce a valve mechanism of the above type wherein the relief valve with associated parts when once arranged in the valve casing and made ready for use do not require any further adjustment or re-setting.

In the carrying out of the objective above noted, it is contemplated to avail of a diaphragm member in association with the relief valve and to control the operation of the valve itself by the use of a cooperating spring predeterminately calibrated to permit the relief function of the valve when back pressure thereon amounts to a certain predetermined poundage. The said spring functions to control the passage of the water or liquid built up by back pressure at the outlet side of the diaphragm member to the drain opening of the valve casing which is normally maintained closed by the valve member until said back pressure exceeds the maximum amount of resistance of the specially calibrated spring that controls the relief movement of said valve.

A full understanding of the invention will be had upon reference to the accompanying drawing and detail explanation in the following specification, and in said drawing—

Figure 1:
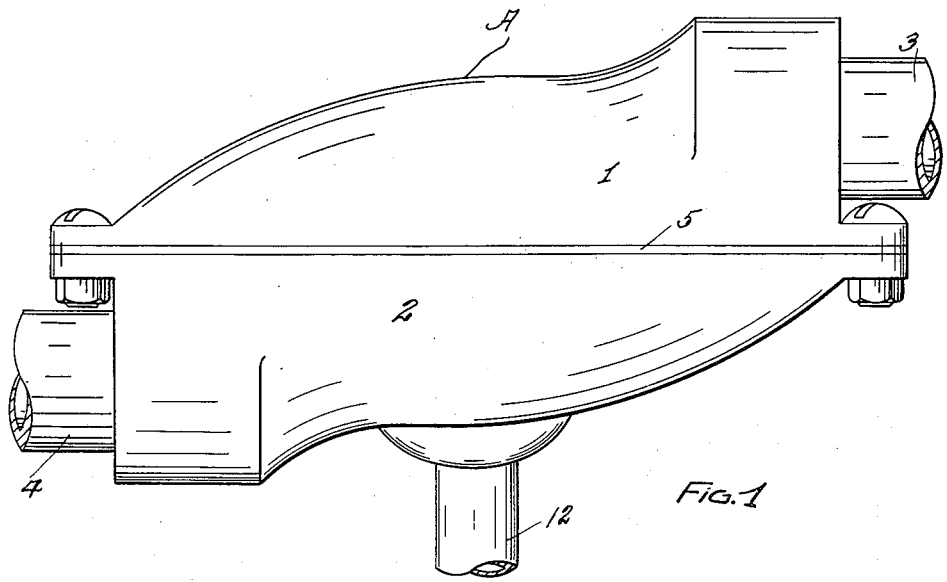
Figure 1 is a side elevation of the valve unit of the invention.

Specifically describing the constructional features of the invention, in the drawing the notation A designates the casing of the valve unit, and this casing is preferably made of upper and lower sections 1 and 2, respectively. At one end of the casing A and joined to the section 1 thereof is the inlet pipe 3. At the opposite end of the casing A and joined to the section 2 thereof is the outlet pipe 4. Medially mounted in the casing and held in place by the clamping action of the abutting portions of the sections 1 and 2 is a flexible diaphragm 5, the middle portion of which is reinforced by upper and lower plate members 6 and 7 respectively.

The members 6 and 7 are connected by screws or bolts in any suitable way, and the upper member 6, the middle of the diaphragm 5, and the lower member 7 are formed with openings which receive the relief valve member 8 which acts as a back pressure relief valve.

Figure 2:
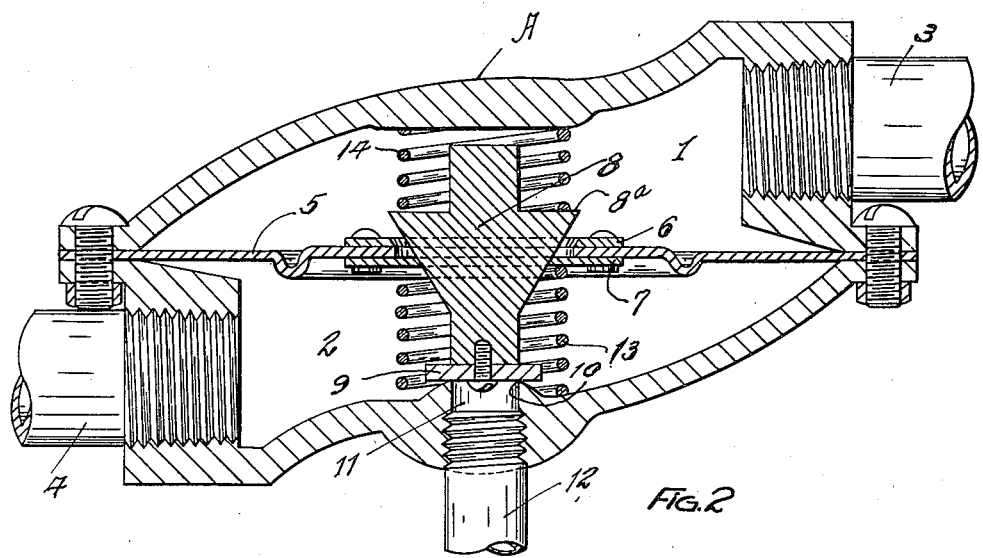
Figure 2 is a vertical longitudinally sectional view of said unit, the inlet and outlet pipes connected therewith shown in elevation and partly broken away in section.

The openings in the parts 6 and 5 through which the valve member 8 extends are somewhat larger than the valve diameter adjacent to said openings, providing a clearance space, but the central opening of the member 7 through which the valve extends fits snugly against the periphery of the valve when the parts are in the normal positions of Figure 2, that is, when fluid is not passing from the inlet 3 to the outlet 4, and when back pressure is not being applied to the diaphragm 5.

The valve member 8 comprises an upper stem portion, an intermediate conical body portion which acts as the main valve, and controlling the passage of fluid through the casing A to the outlet 4, and a lower stem portion having an auxiliary valve disc or part 9 seated upon the valve seat 10 at the relief opening 11 of the casing A. A pipe 12 may be connected with the casing A at the opening 11 to act as a drain pipe for back pressure fluid, as later to be described.

A coil spring 13 interposed between the lower diaphragm plate member 7 and the bottom of the casing A normally holds the diaphragm 5 in its centralized position of Figure 2, with the member 7 coacting with the main valve member 8 to close the chamber of the valve casing above the diaphragm from the chamber of the casing below the diaphragm.

A second coil spring 14 is interposed between the shoulder 8a intermediate the ends of the valve member 8 and the upper portion of the casing A and normally tends to hold the valve member 8 disposed with the valve part 9 seated on the seat 10 so as to close the relief drain opening 11.

It is important to note that the spring 14 is calibrated as of a predetermined number of pounds compression resistance for coaction with the valve member 8. When the relief valve 8 is to be permitted to open the relief opening 11, if the back pressure exceeds ten pounds, then the spring 14 will be calibrated with a resistance accurately of the amount of ten pounds. If the back pressure resisting movement of the valve member 8 is to be a higher number of pounds, the compression resistance of the spring 14 will be correspondingly calibrated. Therefore, once the spring 14 is disposed in position in the casing A coacting with the valve member 8, the amount of back pressure necessary to opening the valve member or part 9 away from the seat 10 of the relief drain opening 11 is predetermined and must be just in excess of the resistance force of said spring 14 as predetermined.

The operation of the invention is as follows:

Water or any fluid enters the casing A through the inlet pipe 3. By its pressure upon the upper side of the diaphragm 5, the latter is lowered, correspondingly moving downwardly the plate or closure member 7 coacting with the main valve member 8. The fluid then may pass by the valve 8 at the conical or middle portion thereof and through the openings of the parts 5, 6, and 7. The fluid in this manner will enter the portion of the casing below the diaphragm 5 and pass out through the outlet pipe 4. When the fluid ceases to enter the casing A at the inlet 3, the spring 13 previously compressed to permit the flow above described will return the diaphragm 5 to its normal position of Figure 2.

If back pressure through the outlet 4 of the casing A, and below the diaphragm 5, reaches an amount in excess of the resisting force of the compression spring 14, predetermined as previously stated; the said back pressure exerted on the underside of the diaphragm 5 and the valve member 8 will lift the member 8, compressing the spring 14 and thus the valve member 8 will be raised to carry its auxiliary valve part 9 upwardly from the seat 10, whereupon the fluid exerting the back pressure will be permitted to pass off through the drain opening 11.

Having thus described my invention, what I claim as new and desire to secure by Letters Patent of the United States, is—

1. In a back pressure relief valve unit, in combination, a casing, an inlet and outlet for the casing, a movable diaphragm in the casing between said inlet and outlet, a valve member associated with said diaphragm, means normally holding the diaphragm in cooperation with the valve member to close communication between the inlet and outlet, but permitting movement of the diaphragm away from the valve member to establish such communication, a back pressure relief opening in the casing at the outlet side of the diaphragm, a valve part operated by said valve member to close said back pressure relief opening, and means for normally holding the valve member in a position so that said valve part closes said relief opening and adapted to be overcome by back pressure on the diaphragm to permit actuation of the valve member to open the relief opening by movement of said valve part.

2. A back pressure relief valve unit as claimed in claim 1, wherein both means mentioned comprise springs, the first means including a spring acting on the outlet side of the diaphragm, and the second means mentioned comprising a spring acting on the valve to hold it in a closed connection with the diaphragm.

3. A back pressure relief valve unit as claimed in claim 1, wherein both means mentioned comprise springs, the first means including a spring acting on the outlet side of the diaphragm, and the second means mentioned comprising a spring acting on the valve to hold it in a closed connection with the diaphragm, the last mentioned spring being calibrated to a predetermined amount of resistance so that back pressure on the side of the diaphragm opposite that at which said spring is disposed, in excess of said predetermined amount of resistance, will cause the movement of the valve member, unseating its valve part to open the pressure relief opening of the casing.

4. In a back pressure relief valve unit, in combination, a valve casing, an inlet therefor, an outlet therefor, a diaphragm between said inlet and outlet, a valve member cooperating with the diaphragm to close communication between the inlet and outlet, the diaphragm being movable by fluid entering from the inlet to open communication between the inlet and the outlet whilst the valve member remains stationary, a valve part on the valve member, a back pressure relief opening normally closed by said valve part, spring means coacting with the diaphragm to normally hold it in a position closing communication between the inlet and outlet, but yieldable to open such communication, and spring means coacting with the valve member to normally hold its valve part seated so as to close the back pressure relief opening.

5. In a back pressure relief valve unit, in combination, a valve casing, an inlet therefor, an outlet therefor, a diaphragm between said inlet and outlet and having a port therein for establishing communication between said inlet and outlet, a valve member cooperating with the diaphragm to close said port for interrupting communication between said inlet and outlet, a valve part on the valve member, a back pressure relief port in said casing, first spring means biasing said valve member to a position wherein said valve part will close said relief port, and second spring means biasing said diaphragm to a position wherein said first mentioned port will be closed by said valve member, said diaphragm being movable in one direction by differential pressure against said second spring means to open said first mentioned port and in an opposite direction by differential pressure to move said valve member against said first spring means to uncover said relief port.

CHARLES J. McNAMARA.